(12) United States Patent
Brandt et al.

(10) Patent No.: US 7,950,044 B2
(45) Date of Patent: May 24, 2011

(54) CENTRALLY MANAGED PROXY-BASED SECURITY FOR LEGACY AUTOMATION SYSTEMS

(75) Inventors: David D. Brandt, Milwaukee, WI (US); Michael A. Bush, Hudson, OH (US); Mark B. Anderson, Chapel Hill, NC (US); Brian A. Batke, Novelty, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1153 days.

(21) Appl. No.: 10/952,317

(22) Filed: Sep. 28, 2004

(65) Prior Publication Data
US 2006/0085839 A1    Apr. 20, 2006

(51) Int. Cl.
*H04L 9/32* (2006.01)
*H04L 9/00* (2006.01)

(52) U.S. Cl. .............................. 726/2; 705/50; 726/27
(58) Field of Classification Search .................. 726/1, 2, 726/9, 11, 12, 34, 27–29; 705/50, 79; 709/222
See application file for complete search history.

(56) References Cited

U.S. PATENT DOCUMENTS

| | | | |
|---|---|---|---|
| 4,155,073 A * | 5/1979 | Ulch et al. ................... | 714/715 |
| 5,446,903 A | 8/1995 | Abraham et al. | |
| 5,539,906 A | 7/1996 | Abraham et al. | |
| 5,617,101 A * | 4/1997 | Maine et al. ................... | 342/358 |
| 6,008,985 A | 12/1999 | Lake et al. | |
| 6,061,798 A * | 5/2000 | Coley et al. ................... | 726/12 |
| H1944 H * | 2/2001 | Cheswick et al. ............... | 726/11 |
| 6,216,209 B1 * | 4/2001 | Cadden et al. ................. | 711/154 |
| 6,223,262 B1 * | 4/2001 | Cadden et al. ................. | 711/154 |
| 6,237,068 B1 * | 5/2001 | Cadden et al. ................. | 711/154 |
| 6,262,730 B1 * | 7/2001 | Horvitz et al. ................. | 715/707 |
| 6,408,336 B1 * | 6/2002 | Schneider et al. ............ | 709/229 |
| 6,557,105 B1 * | 4/2003 | Tardo et al. ..................... | 713/193 |
| 6,760,782 B1 * | 7/2004 | Swales ........................... | 709/250 |
| 6,859,831 B1 * | 2/2005 | Gelvin et al. ................... | 709/224 |
| 6,898,710 B1 * | 5/2005 | Aull ................................ | 713/182 |
| 6,950,944 B2 * | 9/2005 | Yager et al. ....................... | 726/1 |
| 6,965,294 B1 | 11/2005 | Elliott et al. | |

(Continued)

FOREIGN PATENT DOCUMENTS

EP          1414216 A2    4/2004
WO     WO 01/26338 A    4/2001

OTHER PUBLICATIONS

HP OpenView for Windows User's Guide, for Transcend Management Software Version 601 for Windows and '97 for Windows NT Hewlett-Packard Co. 1997, pp. 1-4, 4-1, 4-3, 4-21, and 4-28.*

(Continued)

*Primary Examiner* — Eleni A Shiferaw
(74) *Attorney, Agent, or Firm* — Turocy & Watson LLP; R. Scott Speroff; John M. Miller

(57) ABSTRACT

A system that facilitates enhanced security with respect to an industrial automation environment comprises a legacy device that is existent within an industrial automation system and a central access authority that provides access rules to a proxy. The proxy receives an access request directed to the legacy device and determines whether the access request is permitted based at least in part upon characteristics of the access request and the access rules provided by the central access authority.

31 Claims, 13 Drawing Sheets

U.S. PATENT DOCUMENTS

| | | | |
|---|---|---|---|
| 7,092,943 B2 * | 8/2006 | Roese et al. | 707/9 |
| 7,856,486 B2 * | 12/2010 | Robertson et al. | 709/220 |
| 2003/0206542 A1 * | 11/2003 | Holder | 370/338 |
| 2003/0208448 A1 | 11/2003 | Perry et al. | |
| 2004/0107360 A1 * | 6/2004 | Herrmann et al. | 713/201 |
| 2004/0117624 A1 | 6/2004 | Brandt et al. | |
| 2004/0138786 A1 * | 7/2004 | Blackett et al. | 700/295 |
| 2004/0138834 A1 | 7/2004 | Blackett et al. | |
| 2004/0138934 A1 | 7/2004 | Johnson et al. | |
| 2004/0153171 A1 | 8/2004 | Brandt et al. | |
| 2004/0162996 A1 * | 8/2004 | Wallace et al. | 713/201 |
| 2004/0165544 A1 * | 8/2004 | Cornett et al. | 370/254 |
| 2004/0221179 A1 | 11/2004 | Seshadri | |
| 2005/0068983 A1 * | 3/2005 | Carter et al. | 370/480 |
| 2005/0120240 A1 | 6/2005 | Kiwimagi et al. | |
| 2005/0144437 A1 * | 6/2005 | Ransom et al. | 713/151 |
| 2007/0242836 A1 * | 10/2007 | Basir et al. | 381/86 |

OTHER PUBLICATIONS

European Search Report dated Jan. 26, 2006 mailed Feb. 3, 2006 for European Patent Application Serial No. 10/952,317, 3 Pages.

Chinese Office Action dated Jul. 11, 2008 for Chinese Patent Application Serial No. 200510138025.9, 20 pages.

Taiwan Office Action dated Sep. 22, 2008 for Taiwan Patent Application Serial No. 94133540, 14 pages.

3COM, "HP OpenView for Windows Users Guide", Hewlett-Packard Co., Oct. 1997, 155 pages.

US H1944 H, Cheswick, et al. Statutory Invention Registration published Feb. 6, 2001, 12 pages.

European Office Action dated Oct. 25, 2006, for European Patent Application Serial No. 05021180.4, 4 pages.

Australian Search Report mailed Oct. 30, 2006 for Singapore Patent Application Serial No. 200506168-4, 4 pages.

* cited by examiner

CENTRALLY MANAGED PROXY-BASED SECURITY FOR LEGACY AUTOMATION SYSTEMS

TECHNICAL FIELD

The subject invention relates generally to industrial system automation, and more particularly to security relating to factory floor devices within the industrial system.

BACKGROUND OF THE INVENTION

Advancements in technology have enabled factory applications to become partially or completely automated. For example, applications that once required workers to put themselves proximate to heavy machinery and other various hazardous conditions can now be completed at a safe distance from such hazards. Further, imperfections associated with human action have been minimized through employment of highly precise machines. Many of these factory devices supply data related to manufacturing to databases that are accessible by system/process/project managers on a factory floor. For instance, sensors can detect a number of times a particular machine has completed an operation given a set amount of time. Further, sensors can deliver data to a processing unit relating to system alarms. Thus, a factory automation system can review collected data and automatically and/or semi-automatically schedule maintenance of a device, replacement of a device, and other various procedures that relate to automating a process.

It is often impractical for businesses, however, to implement cutting-edge technology within their factory automation system. In other words, it is not profitable for manufacturing companies to replace existing automation devices and/or systems that, while not on the cutting edge of technology, still effectively perform their assigned tasks. These older systems/devices are commonly referred to as legacy devices and systems. While these legacy systems can perform specific tasks such as data collection and relay, continued use of such systems is associated with several deficiencies. One particular exemplary deficiency is that several of these legacy systems/devices are not associated with sufficient security. Specifically, as legacy devices and/or systems are often optimized for particular tasks, they lack capabilities to house integral security features.

Compromising security with respect to legacy devices to maintain cost of production, however, can lead to catastrophic results. For one particular example, legacy systems and/or devices can be employed in connection with generating a pharmaceutical product, food product, or other ingestible product. If security of the manufacturing system were not an issue, the legacy systems could be implemented to perfectly generate the ingestible product according to a recipe (absent maintenance issues). However, in a time of increased threats of terrorism, security relating to such legacy systems still in use is of utmost importance. For instance, an automation controller can be optimized to control a mixing operation related to a particular pharmaceutical, but lack integral security features. Due to this lack of security, an operator or maintenance person may accidentally or maliciously alter the mixing operation to render the pharmaceutical harmful to those who depend upon such pharmaceutical. In another example, a software module can be employed to alter a recipe and procedure implemented in an automation controller.

To render these legacy systems more secure, security can be embedded within such devices. However, such embedded security will not be completed for a substantial period of time, due to expenses associated with modifying the devices to include integral security procedures, adding hardware for such security procedures, locating designers experienced with security design, etc. Further, there has been no agreement as to security standards that are to be employed with respect to legacy systems/devices. Thus, there currently exists no mechanism to quickly enhance security with respect to factory automation systems/devices that are still utilized in association with manufacturing.

In view of at least the above, there exists a need in the art for a system and/or methodology for quickly, efficiently, and inexpensively enhancing security with respect to legacy systems/devices within a factory automation environment.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates enhancing security of an industrial automation system that includes legacy devices. Enhanced security relating to legacy devices is desirable, as security has become increasingly important with respect to industrial manufacturing. Further, most legacy devices can adequately complete tasks for which they were designed. The subject invention provides enhanced security by utilizing a centralized security system (e.g., a central access authority). This security system can provide access rules and privileges to both legacy devices that cannot include inherent security features as well as updated automation devices that are capable of including inherent security features. Therefore, modification of security rules and privileges can be done at a central location rather than at each automation device, and can be completed dynamically. For instance, an employee on a first shift can attempt to render system changes with respect to a second shift. The security system of the subject invention can prevent such changes, as it would have knowledge of the employee's schedule.

Legacy devices are protected by associating proxies therewith. These proxies effectively prohibit a requesting entity from communicating with a legacy device until such requesting entity has been authenticated and authorized by the central access authority. In particular, the proxy can utilize access rules provided by the central access authority to determine whether a requesting entity can access the legacy device protected by the proxy, as well as prohibit and deny access to a legacy device based at least in part upon the aforementioned determination. Thus, for instance, the proxy can include sufficient memory to permanently store the access rules, and thereafter apply such access rules to a request for communication. Alternatively, if the proxy does not include sufficient memory to permanently store access rules, it can receive such access rules from the central access authority upon receipt of a request to access the legacy device. The request for access can be associated with a plurality of characteristics, such as an identity of an entity requesting access, time and/or system state of the access, action(s) desirably taken by the requesting entity, location of the requesting entity, whether the request is for read-only access, read/write access, write-only access, etc. The proxy can thereafter determine whether the requesting entity can access the legacy device based at least in part upon an analysis that compares the access rules provided by the central access authority and characteristics associated with the request. Thus, the proxy can effectively control who (e.g., particular operators, devices, . . . ) accesses a legacy device, when (e.g., times, system states, . . . ) such access is allowable, where (e.g., location of a requesting entity, location of the legacy device, . . . ) such action is allowable, and type of actions allowable.

In accordance with one aspect of the subject invention, the proxy can be employed to provide security to a plurality of legacy devices. For instance, the proxy can retain and/or have access to rules associated with several different legacy devices. Therefore, for example, the proxy can be housed in a server within an IT infrastructure. The proxy can also be a network communication infrastructure device such as an in line dongle, a router, a firewall, an intelligent switch, or the like. The proxy can be attached to an access port of the legacy device, and/or communicatively connected in any suitable manner to the legacy device (e.g., the proxy can be attached to a remote terminal that is communicatively connected to the legacy device). For instance, the proxy can include a receiver and transmitter, and can relay communications from a requesting entity to the proxy wirelessly. Accordingly, any suitable arrangement of the proxy is contemplated, so long as such proxy is employed to control access to the legacy device(s).

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
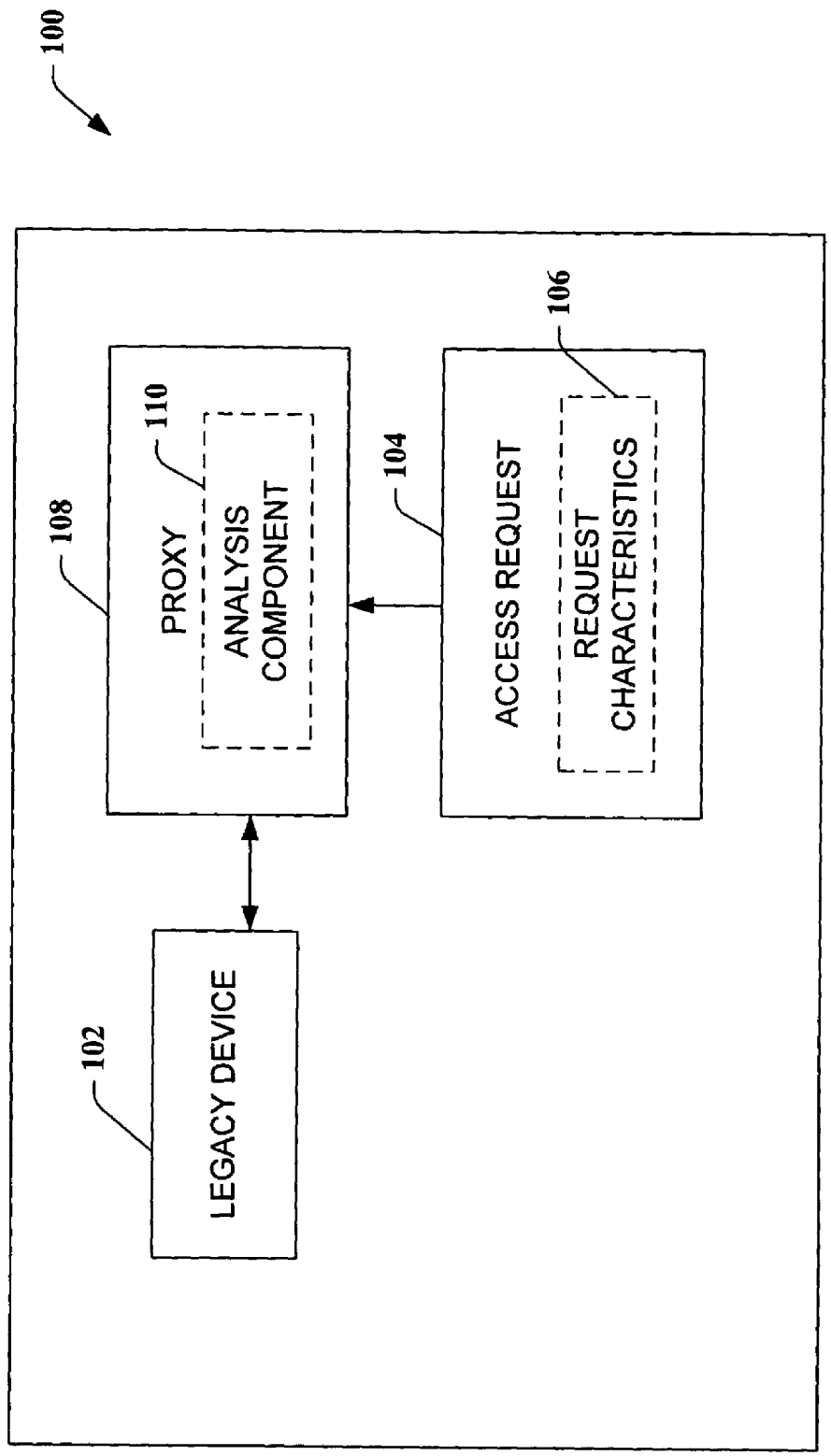
FIG. 1 is a high-level block diagram of a system that facilitates enhancing security with respect to an industrial automation system that includes a legacy device in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with an aspect of the subject invention. The subject invention relates to a novel system 100 that facilitates enhancing security with respect to automation systems that include legacy devices. The system 100 is an industrial automation system that includes a legacy device 102 that does not include sufficient intelligence to store and/or analyze security primitives. The legacy device 102, for example, may not desirably be replaced with a device with such intelligence due to high replacement costs and continued effectiveness for a particular purpose. As described above, however, security surrounding the legacy device 102 is of utmost importance. The legacy device 102 can be an industrial controller such as a programmable logic controller (PLC), a series of interconnected industrial controllers, or any other suitable processing device or series of processing devices. The legacy device 102 can also relate to manufacturing equipment. For instance, the legacy device 102 can be housed by an industrial manufacturing device, such as a press, pump, conveyor, etc.

A request 104 is made desiring access to the legacy device 102. For instance, an operator can initiate such request 104 through a work terminal on a factory floor, the request 104 can be initiated at a high-level system such as an enterprise resource planning (ERP) system, or any other suitable manner for initiating a request. The access request 104 can be associated with request characteristics 106. For example, the request characteristics 106 can relate to an operator—such as identity of the operator, role of the operator within a business, location of the operator at a time the request 104 is initiated, etc. Further, the request characteristics 106 can relate to the identity of a machine desirably accessed, time of desired access and/or time of origination of the request 104, action desirably taken by an initiator of the access request 104, etc. In accordance with one aspect of the subject invention, the request characteristics 106 can include the aforementioned characteristics 106. Thus, a component receiving the access request 104 also receives the request characteristics 106 at a substantially similar time. Moreover, the access request 104 can contain or be followed by instructions for performing an action on the legacy device 102 and/or modifying contents on the legacy device 102.

Prior to a requesting entity being given access to the legacy device 102, a proxy 108 can review the access request 104 and/or the request characteristics 106 to determine whether such access to the legacy device 102 is authorized. In other words, the proxy 108 can be employed to prohibit unauthorized access requests from being received by the legacy device 102. A determination of whether or not to allow access to the legacy device is made by an analysis component 110 that is employed by the proxy 108. Thus, for example, the analysis component 110 can review the request characteristics 106 associated with the access request 104 and determine whether to allow access to the legacy device based upon the analysis. A set of provided rules can be employed by the analysis component 110 in connection with determining whether to allow access to the legacy device 102 based upon the access request 104 and/or associated request characteristics 106. For instance, a central access authority (not shown) can be utilized to provide access rules for a plurality of proxies that are employed to protect a plurality of legacy devices. Therefore, an enhanced global security system can exist that protects both legacy devices as well as updated automation devices, as rules relating to access analysis can be stored in proxies for legacy devices and stored directly within updated automation devices. Further, if the proxy 108 includes insufficient processing capabilities to analyze the access request 104, such proxy 108 can be utilized to route the access request 104 to a central access authority. Thereafter the central access authority can determine whether access is to be allowed or denied and instruct the proxy 108 according to the determination. Thus, the analysis component 110 can simply be a routing instrument. However, it is to be understood that the invention is not so limited.

The proxy 108 can also be employed to disable communications between a requesting entity and the legacy device 102 upon a set period of inactivity. For instance, upon accessing the legacy device 102, a session typically occurs, where multiple messages are delivered between a requesting entity and the legacy device 102. Generally, a communication will include a portion of data that indicates to the legacy device 102 and the proxy 108 when the communication is completed. If there is a failure of communication, however, it may not be desirable to allow continued access to the legacy device 102. Thus, the proxy 108 can monitor activity of communication relating to the legacy device 102 and disable a communication line based upon a period of inactivity. Thus, for example, the proxy 108 can actively ping an entity requesting access to determine whether such entity remains connected to the legacy device 102. Further, the proxy 108 can include sensors that monitor whether both the legacy device 102 and a requesting entity remain connected to one another. For example, a session can be closed by the proxy 108 based on a lack of data flow and/or link-level disconnection notification.

In accordance with another aspect of the subject invention, the proxy 108 can be a dongle. A dongle is a hardware device that is connectable to a computer and acts as an authentication key for the access request 104. In particular, when the request characteristics 106 are such that access to the legacy device 102 should be permitted, the dongle will allow access to the legacy device 102. Thus, for example, the dongle can be employed to convert from Ethernet to Ethernet and filter traffic relating to the legacy device 102. When such access request 104 is not allowed, the dongle will prevent access to the legacy device 102. Further, the dongle can be associated with built-in encryption and be associated with fabrication techniques that are designed to render reverse engineering of the dongle difficult. Moreover, the dongle can include a replacement port, thereby allowing the dongle to be employed as an in-line communication device. Similarly, the dongle can be permanently attached to an access port of the legacy device 102, either external to the legacy device 102 or in replacement of a device access port connector. Further, the proxy 108 can be an intelligent switch, a firewall, a router, and/or hosted upon a server. If the proxy 108 is hosted upon a server, the infrastructure of the system 100 is configured to route all traffic for the legacy device 102 through the proxy 108. It is thus understood that the proxy 108 can be any suitable device that can be utilized to monitor and control communications to and from the legacy device 102.

The legacy device 102 can be associated with and/or include a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 100 as legacy device, it is to be understood that any suitable device can be employed in connection with the subject invention. For example, any suitable microprocessor and/or microcontroller can be utilized within the system 100 and be associated with the legacy device 102.

Figure 2:
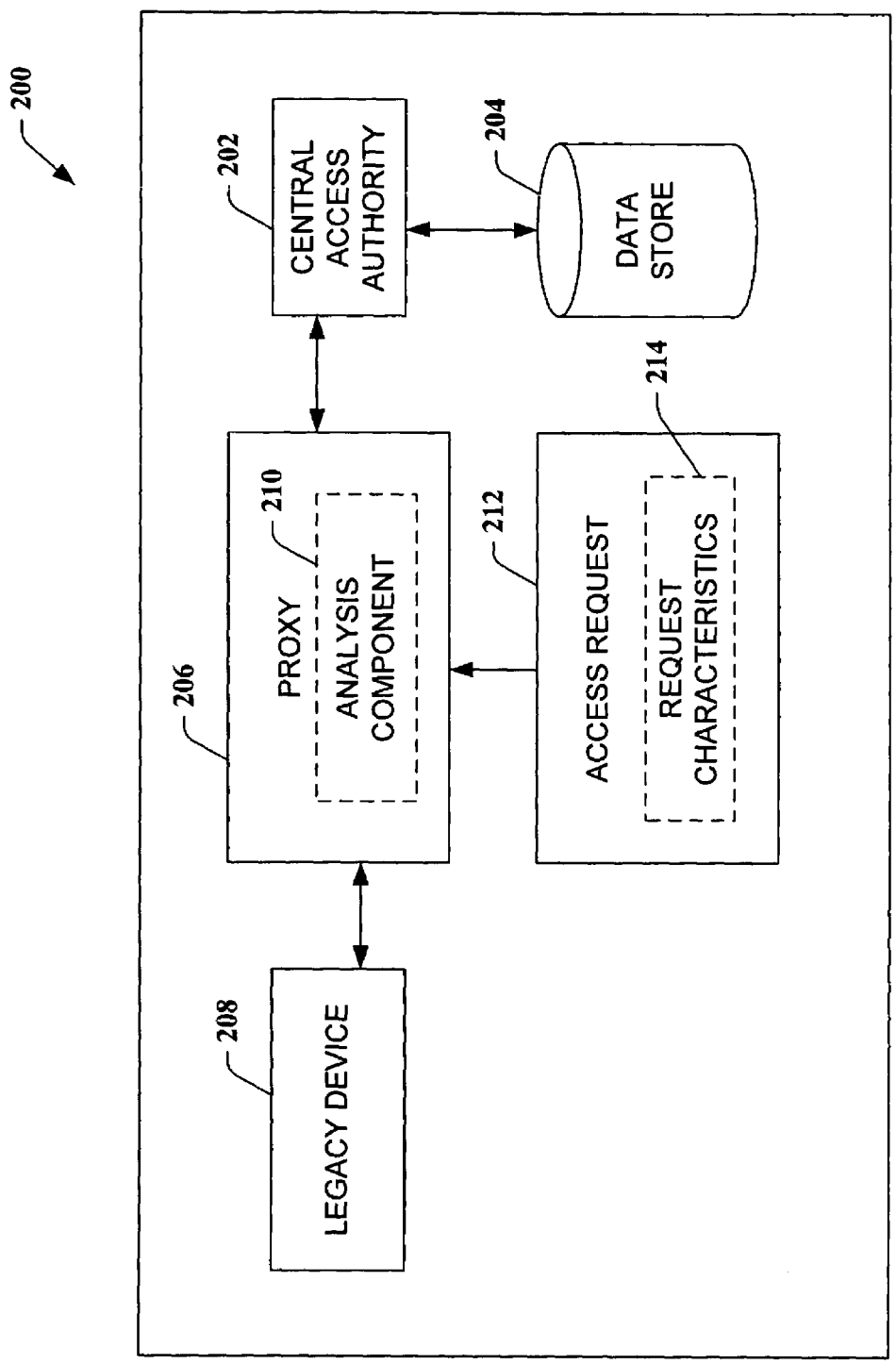
FIG. 2 is a block diagram of a system that facilitates enhancing security with respect to an industrial automation system that includes a legacy device in accordance with an aspect of the subject invention.

Turning now to FIG. 2, an enhanced security system 200 relating to legacy devices in an industrial automation environment is illustrated. The system 200 includes a central access authority 202 that provides access rules to be employed in connection with determining whether communications are allowable with respect to one or more legacy devices. For example, the central access authority 202 can provide access rules based at least in part upon identity of an operator or device requesting access, type or identity of information that can be manipulated or functions of an automation device that can be invoked by the identified entity, positioning of the requesting entity and automation device with respect to one another (e.g., an operator may be forced to be in sight of a system or device to be modified), and/or when access is allowed to occur, which can be based upon time and/or system state. Additional parameters relating to providing access rules are also contemplated by the inventors of the subject invention, and are intended to fall under the scope of the hereto-appended claims.

The central access authority 202 can be associated with a data store 204 that can store particular system configurations as well as previously generated rules. Further, the data store 204 can store previous system configurations, access rules, requests for particular devices, and any other suitable information that may be pertinent to system security and data logging. While rules provided by the central access authority 202 can be delivered directly to an updated automation device (not shown) and implemented directly by such automation device, legacy devices typically do not include sufficient processing capabilities and/or memory to enable such implementation of security primitives. Therefore, the system 200 utilizes a proxy 206 to monitor communications desirably delivered to and from a legacy device 208. The proxy 206 implements rules generated by the central access authority 202 to control communications access to the legacy device 208. For instance, the proxy 206 can include an analysis component 210, wherein such analysis component 210 includes access rules generated by the central access authority 202. Thus, the analysis component 210 within the proxy 206 can include sufficient memory and processing to permanently include access rules and implement such access rules. In a disparate embodiment, the analysis component 210 can be employed to request access rules from the central access authority 202 at a time of an access request. However, access to the legacy device 208 will then be precluded if the central access authority 202 is not on-line with the proxy 206. In accordance with another aspect of the subject invention, an operator can cache access rules in a secure portable programming terminal (not shown). Thus, even if the central access authority 202 is not on-line with the proxy 206, the terminal can be connected to the proxy 206, and the proxy 206 can obtain the access rules from the portable terminal and apply such rules to an access request. In this embodiment, device and/or information authentication techniques can be employed to ensure that the terminal includes authorized rules. Various encryption techniques, for instance, can be utilized in connection with the subject invention.

The system 200 can operate in a following manner. An entity (not shown) generates an access request 212 with respect to the legacy device 208. The access request 212 includes request characteristics, which related to the initiator of the access request 212. For example, the request characteristics 214 can include an identity of the entity initiating the access request 212, the location of the entity, the location of the legacy device 208, the action desirably undertaken, etc. The access request 212 is directed to the proxy 206 (or, in a disparate embodiment, the access request can be provided directly to the central access authority 202). If the analysis component 210 includes access rules provided by the central access authority, the proxy 206 can determine whether the request 212 should be accepted and communication should be allowed with the legacy device 208. If the analysis component 210 does not include sufficient memory and/or processing to utilize the rules, the proxy 206 can direct the access request 212 to the central access authority 202. Thereafter, the central access authority 202 can determine whether access should be permitted to the legacy device 208. The central access authority can then instruct the proxy 206 according to the determination. Further, while the system 200 shows the single proxy 206 that controls access to the single legacy device 208, the central access authority can provide access rules to multiple proxies that control access to a plurality of legacy devices. Further, the single proxy 206 can control access to multiple legacy devices. Configuration of the system 200 of the subject invention is flexible according to needs of a particular business. For example, the proxy 206 can be positioned at various points in the system (e.g., attached externally to a device, positioned within a device access port, . . . ).

There are several benefits in employing the central access authority 202 in connection with providing security rules for legacy devices within an industrial system. For instance, certain operators may desirably access numerous distributed systems, and it is inconvenient to visit and alter each device to modify access rights relating to such device. Further, device-to-device access can form an over-complex web, thereby rendering local alterations impractical. Further, the central access authority 202 can provide a mechanism for centrally collecting audit information. Yet another benefit of employing the subject invention relates to an ability to restrict access of an operator to the legacy device 208 based upon location of the operator relative to a location of the legacy device. For example, a pharmaceutical facility typically contains several mixing operations that are associated with similar and/or identical automation systems. An operator can inadvertently modify operation of an inherently dangerous machine (e.g., start operation, stop operation, . . . ) due to such similarity. Often, all the mixing operations are interconnected using a communication network—yet, the operator can be at a distant location from the machine in which operation is altered, completely oblivious to harmful results that such operator unintentionally caused. As the subject invention can account for location of an operator relative to the legacy device 208, occurrences of problems similar to the above can be drastically reduced.

When the system 200 is commissioned or modified, the proxy 206 can be associated with the central access authority 202. This means that corresponding information (such as keys) can be stored in the proxy 206 and within the central access authority 202 to allow secure communication and linkage between the proxy 206 and the central access authority 202. For instance, the aforementioned association can be accomplished by a one-on-one connection of the proxy 206 and the central access authority 202 prior to deployment of the system 200. In a disparate aspect of the subject invention, the proxy 206 can be configured to include an integral private key, and a public key can be entered into the central access authority by disk, download, proxy query, or other suitable manner. The proxy 206 can then be commissioned remotely. Upon commissioning of the proxy 206, the legacy device 208 can be logically linked to such proxy 206. For instance, the proxy 206 can query the legacy device 208 and create a fingerprint of such legacy device 208 that is used to check for valid device replacement.

Figure 3:
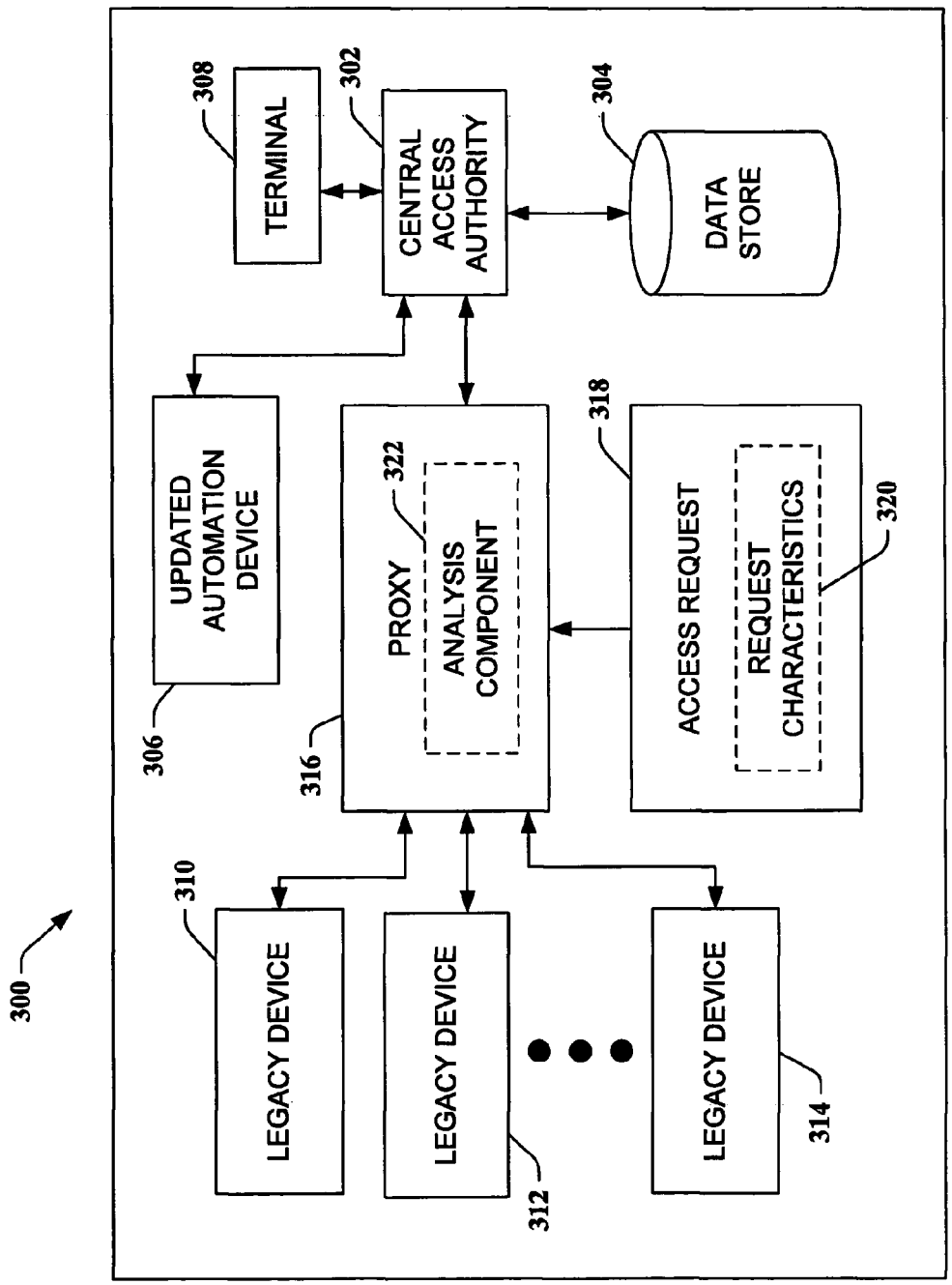
FIG. 3 is a block diagram of a system that facilitates enhancing security with respect to an industrial automation system that includes a legacy device in accordance with an aspect of the subject invention.

Referring now to FIG. 3, an enhanced security system 300 employed to provide security to legacy devices is illustrated. The system 300 includes a central access authority 302 that operates to provide access rules and access rights relating to devices within an industrial automation system. For instance, access rules provided by the central access authority 302 can relate to identity of users, devices, contextual information related to users and/or devices, etc. The provided rules can be stored in a data store 304 that is associated with the central access authority 302. For example, these stored access rules can be provided directly to an updated automation device 306, which directly supports device security. In accordance with one aspect of the subject invention, an outside terminal 308 can be utilized to inform the central access authority 302 of access rules relating to the updated automation device. For instance, the updated automation device 306 can recently have been added to the system 300. An executive or other operator with authority to enter disparate access rules can inform the central access authority 302 of operators who are to be provided access to the device 306, other devices that can have access to the automation device 306, times and/or system state(s) that access is permitted to the updated automation device 306, applications permitted in connection with the automation device 306, etc. Thus, access rules relating to the updated automation device 306 can be entered a single time at the central access authority 302.

The system 300 further includes a plurality of legacy devices 310-314. A single proxy 316 is employed in connection with the central access authority 302 to determine whether an entity requesting access is granted access to one or more of the legacy devices 310-314. In particular, an access request 318 is received by the proxy and analyzed to determine whether the entity (not shown) initiating the access request 318 is to be granted access to one or more of the legacy devices 310-314. For example, the entity making the request 318 can be an operator and/or another automation device. In particular, the access request 318 can be associated with request characteristics 320, such as identity of an entity initiating the request 318, time of request, legacy device to which access is desired, etc. The proxy 316 receives the access request 318, and employs an analysis component 322 to determine whether the entity initiating the access request 318 is to be allowed access to the specified legacy device(s). For instance, the analysis component 322 can include rules provided by the central access authority 302, and can determine whether the requesting entity is granted access by applying the rules against the request characteristics 320. The rules can be permanently stored within the proxy 322, or alternatively delivered to the proxy 316 from the central access authority upon receipt of the access request 318. Utilizing the system 300 of the subject invention, access will not be granted to one or more of the legacy devices 310-314 until the proxy 316 has authorized such access. This enhanced security system 300 mitigates occurrences of unauthorized access to automation devices that lack internal security features, and extends usable life of such legacy devices 310-314.

Figure 4:
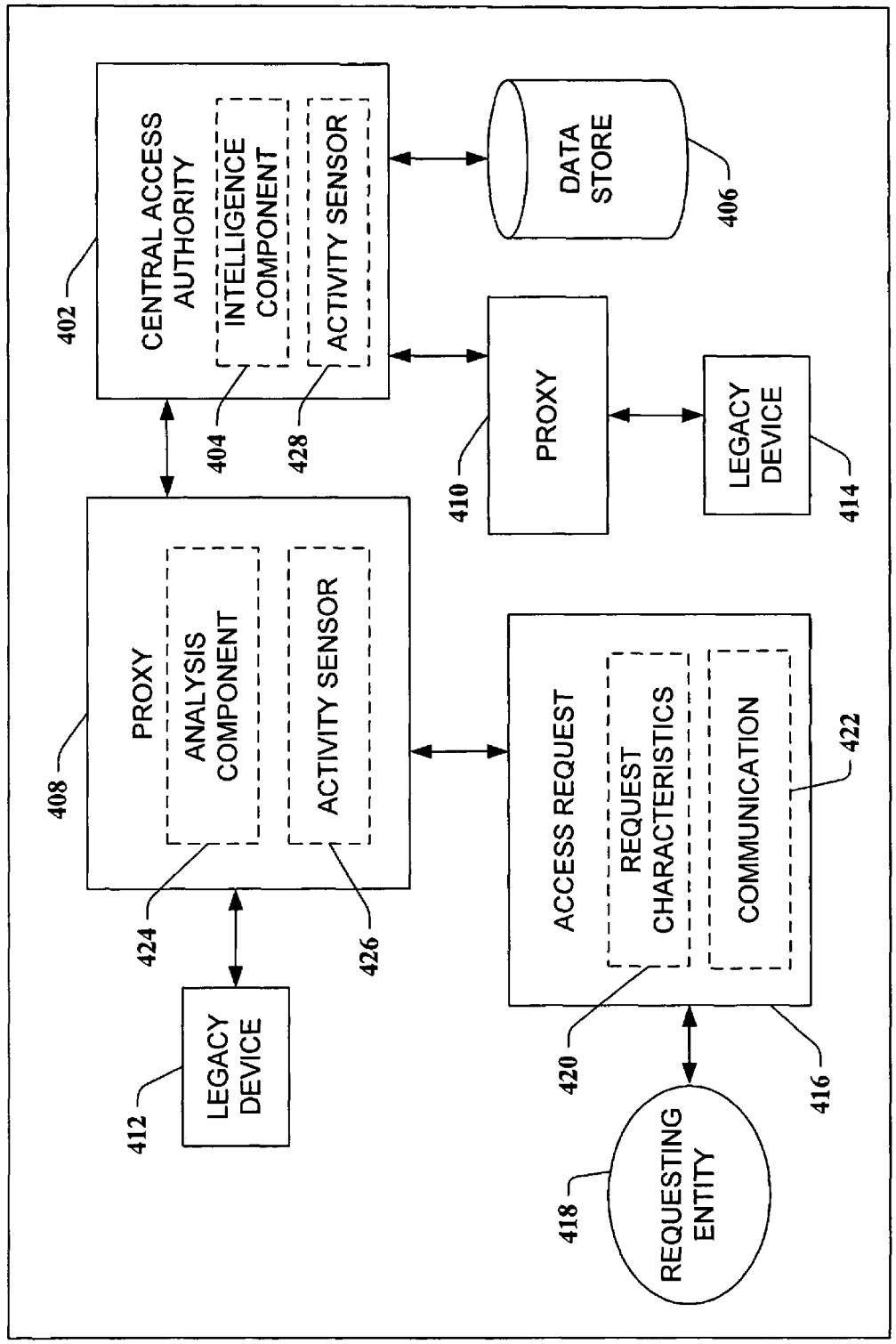
FIG. 4 is block diagram of a system that facilitates enhancing security with respect to an industrial automation system that includes a legacy device in accordance with an aspect of the subject invention.

Turning now to FIG. 4, a system 400 that facilitates enhanced security in an industrial automation environment that includes legacy devices is illustrated. The system 400 includes a central access authority 402 that provides access rules with respect to one or more automation devices within the system 400. These rules can be at least partially provided to the central access authority 402 through a user terminal. For instance, upon initially adding an automation device to the system 400, access rules, rights, and regulations should be provided to the central access authority 402 to facilitate central security regulation. The central access authority 402 can include an intelligence component 404 that can automatically generate robust access regulations based upon inferences related to the added automation device and known system configuration.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For example, based upon a current system configuration, identity of an individual adding the automation device to the system, time device is added to the system, etc., the intelligence component 404 in connection with the central access authority 402 can automatically generate robust privileges. For a particular example, a particular operator over time may be observed to only wish to provide a select group of operators access to automation devices. By watching the particular operator over time, the intelligence component 404 can learn access privileges that are associated with operator. The intelligence component 404 can employ a cost/benefit analysis in connection with generating access rules/privileges. For instance, the intelligence component 404 can review probabilities and benefits of generating correct access rules and weigh such review against probabilities and costs of generating incorrect access rules. Upon generation and/or obtainment of access rules, the central access authority 402 can store such access rules in a data store 406.

The central access authority 402 provides these access rules to proxies 408 and 410, which are employed to protect legacy devices 412 and 414, respectively, from attack and/or mistake. In accordance with the exemplary system 400, the proxy receives an access request 416 from a requesting entity 418. For instance, the entity 418 can be an operator utilizing a workstation, another automation device, or any other suitable entity. The access request includes request characteristics 420 that indicate various attributes of the request. The access request 416 can further be associated with a communication 422 that is desirably delivered to the legacy device 412 protected by the proxy 408. For instance, the communication 422 can relate to a session that is desirably undertaken with the legacy device 412.

The proxy 408 receives the access request 416 and utilizes an analysis component 424 to determine whether the requesting entity 418 can access the legacy device 412. Particularly, the proxy 408 employs rules provided by the central access authority 402 to analyze the request characteristics 420 associated with the access request 416. If a determination is made based upon such analysis that the entity 418 is not entitled to access to the legacy device 412, the proxy 408 will not allow communications between the entity 418 and the legacy device 412. If the proxy 408 determines that the entity 418 is entitled to access the legacy device 412, the proxy will enable a communication channel to be opened between the entity 418 and the legacy device 412 via the proxy 408. The proxy 408 further includes an activity sensor 426 that monitors activity between the entity 418 and the legacy device 412 after communication therebetween has been enabled. For instance, the activity sensor 426 can monitor data flow between the legacy device 412 and the entity 418, can review for link-level disconnection, and can actively ping the entity 418 to ensure that such entity 418 is still communicating with the legacy device 412. If the activity sensor 426 determines that there no longer is active communication between the entity 418 and the legacy device 412, the proxy can close a communication channel therebetween. Further, if the activity sensor 426 finds that the entity 418 and/or the legacy device 412 have become disconnected, it can relay such finding to the central access authority 402. Thereafter, the central access authority 402 can provide an operator with notification of such disconnection, and can further update security procedures relating to the disconnection. While only the proxy 408 is shown to include the analysis component 424 and the activity sensor 426, it is to be understood that the proxy 410 can include substantially similar components that are employed in connection with providing security with respect to the legacy device 414.

In accordance with another aspect of the subject invention, the activity sensor 426 can detect tampering with the legacy device 412 and/or the proxy 408. The proxy 408 can then deliver this information to the central access authority 402, which can thereafter take appropriate action with respect to the system 400 (e.g., shut the system down until an authorized operator re-starts the system 400). Similarly, the central access authority 402 can include an activity sensor 428 and monitor activities of the proxies 408 and 410. If the activity component 428 determines that one of more of the proxies 408 and 410 have been tampered with, the central access authority 402 can perform appropriate security measures.

Figure 5:
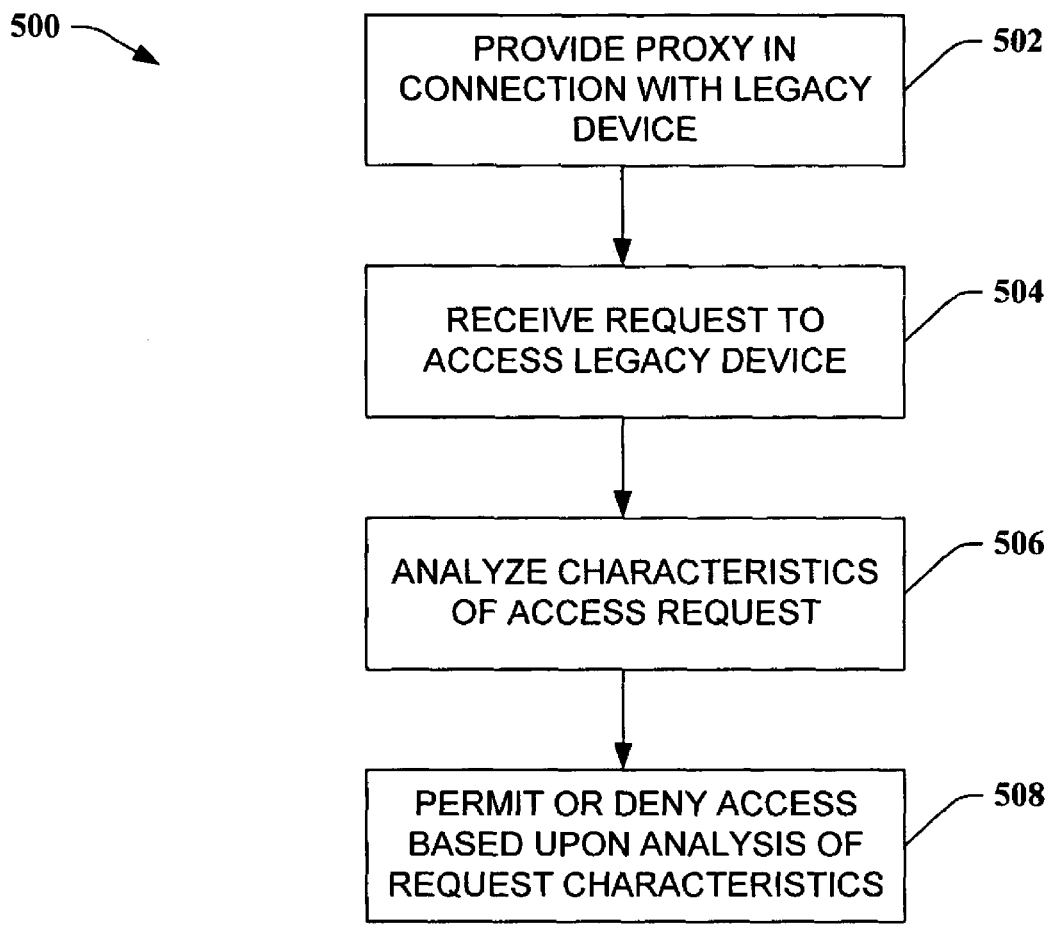
FIG. 5 is a representative flow diagram illustrating a methodology for enhancing security for an automation system that includes a legacy device in accordance with an aspect of the subject invention.

Turning now to FIG. 5, a methodology 500 for implementing enhanced security procedures within an industrial automation system that includes one or more legacy devices is illustrated. While, for purposes of simplicity of explanation, the methodology 500 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, a proxy is operably coupled to a legacy device. For example, the proxy can be a dongle that is connected to the legacy device. In a disparate instance, the proxy can include a receiver and transmitter, and communicate with the legacy device via a wireless communication channel. Thus, the proxy is not required to be physically connected to the legacy device. Further, the proxy can be hosted upon a server. Thus, any communication delivered to the legacy device is directed through the server. Such an implementation can be beneficial when the server is within an IT infrastructure of a security system.

At 504, the proxy receives an access request relating to the legacy device. The request can originate from an operator, from an intelligent automation device, from a legacy device, from a disparate system, etc. Thus, it is to be understood that the access request can be initiated by any suitable source. At 506, characteristics of the access request are analyzed. Particularly, the access request will be associated with characteristics such as an identity of an individual or device initiating the access request, identity of the legacy device to which access is requested, time of request, system state at the time of the request, and any other suitable characteristics that can be associated with the request. The analysis at 506 can be based upon access rules provided by a central access authority. For instance, the proxy can retain access rules relating to one or more device(s) protected. Thus, upon receipt of the request, the request characteristics can be analyzed in connection with the retained rules. In accordance with a disparate aspect of the subject invention, the proxy may include insufficient memory to permanently retain access rules relating to one or more legacy devices. Therefore, the proxy can query a central data store for appropriate access rules upon receipt of the access request. In such an embodiment, the data store must be connected to the proxy, and communication therebetween must be enabled.

At 508, access is permitted or denied by the proxy based upon the analysis at 506. For example, the access rules utilized by the proxy can permit or deny access based upon characteristics of the access request. For instance, an access rule can state that access can be provided only to a specific set of operators. Thus, it can be determined whether access should be permitted or denied by reviewing the request characteristics (e.g., review an identity of an operator initiating the request). Similarly, various other access rules can be applied, wherein request characteristics can be analyzed in light of one or more access rules that are provided by a central access authority. If it is determined that access should be denied, then the proxy can prohibit the requested communication from occurring. If such access is to be permitted, then the proxy can enable communication between the entity requesting access and the legacy device.

Figure 6:
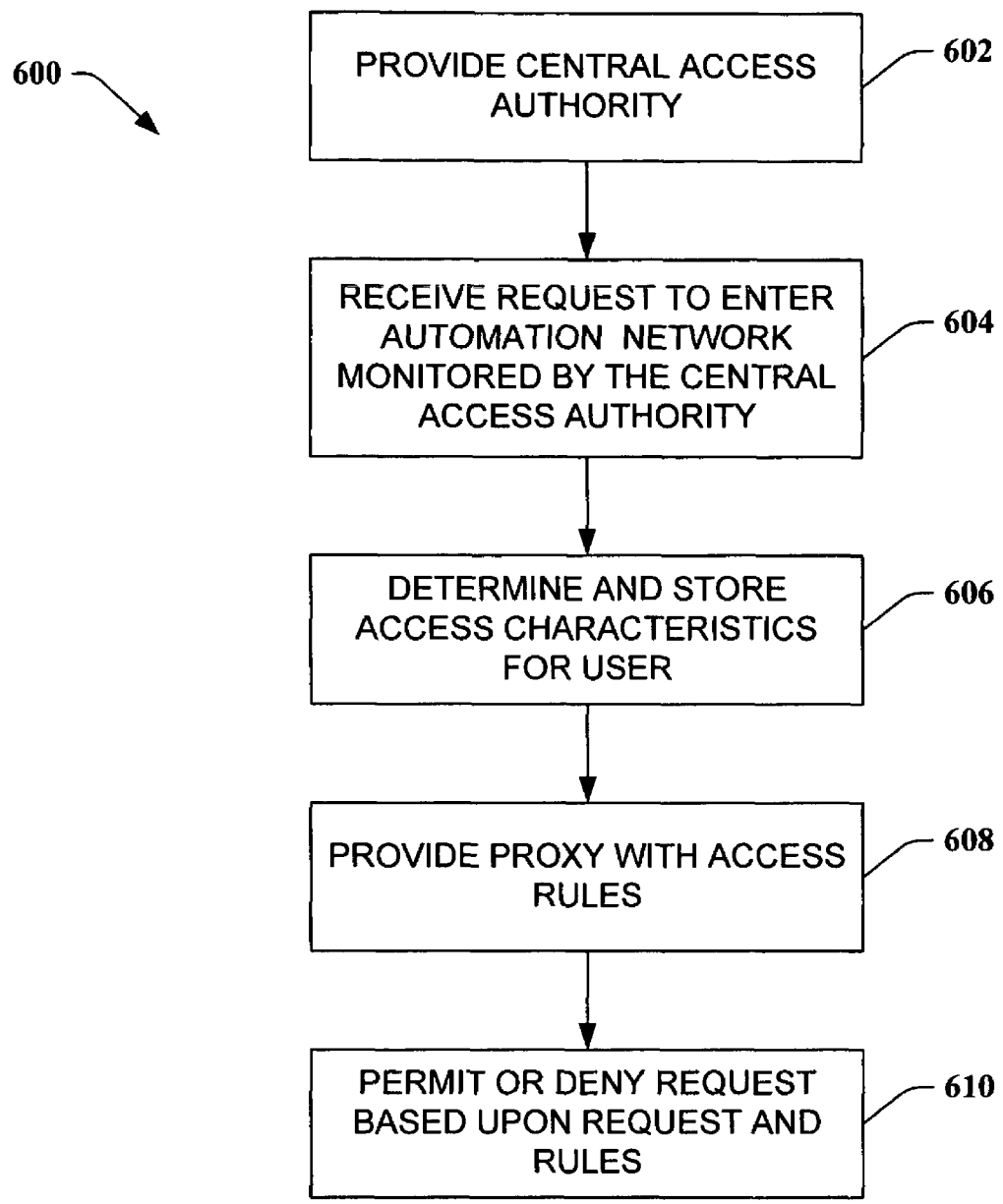
FIG. 6 is a representative flow diagram illustrating a methodology for providing enhanced security for an industrial automation system in accordance with an aspect of the subject invention.

Now turning to FIG. 6, a methodology 600 for providing access rules in an automation system that includes one or more legacy devices is illustrated. At 602, a central access authority is provided. Providing a centralized security system is beneficial in an industrial automation environment, as requiring disparate operators to generate access rules for disparate legacy devices is burdensome, and can create complex web of interdependencies between devices, thereby rendering modification of access privileges a daunting challenge.

At 604, a request to access an automation system monitored by the central access security is received. For instance, an operator may desire to obtain access privileges and/or modify access privileges from a workstation that can communicate to the automation system. Thus, for example, an operator at an enterprise resource planning level may wish obtain access privileges with respect to one or more legacy devices. To obtain these privileges and to facilitate generation of access rules relating to the operator and the legacy device, the operator first requests access from the centralized system.

At 606, access characteristics can be determined for the user and stored. For instance, conventional user-name and password techniques can be employed to authenticate an identity of an operator, and access privileges can be generated based upon such identification. Further, role in the company of the operator and any other suitable factor can be utilized in connection with determining access privileges related to the user. In accordance with another aspect of the subject invention, biometric authentication techniques can be employed by the central access authority to authenticate an operator identity. For instance, a pressure sensitive mechanism and/or digital photography component can be utilized to verify an operator's fingerprint. Further, computer-based facial feature recognition techniques, voice recognition techniques, and the like can be utilized in connection with authenticating an operator identity. Upon such authentication, access rules can be generated for requested legacy devices based upon the legacy devices, information associated with the operator, and other suitable parameters.

At 608, a proxy that is employed to protect the legacy device subject to a communication request is provided with the access rules. Thus, the central access authority can determine which legacy device(s) that the operator desires to access, and provide access rules to proxies that are utilized to protect such legacy device(s). If the proxy is associated with sufficient data storage, such proxy can store the access rules within the aforementioned storage. At 610, a request to communicate with a legacy device is permitted or denied based at least in part upon the rules generated by the central access authority and entered into the proxy. Particularly, the proxy is configured to allow or disallow communications between a requesting entity and a legacy device based upon an analysis of an access request and the provided rules.

Figure 7:
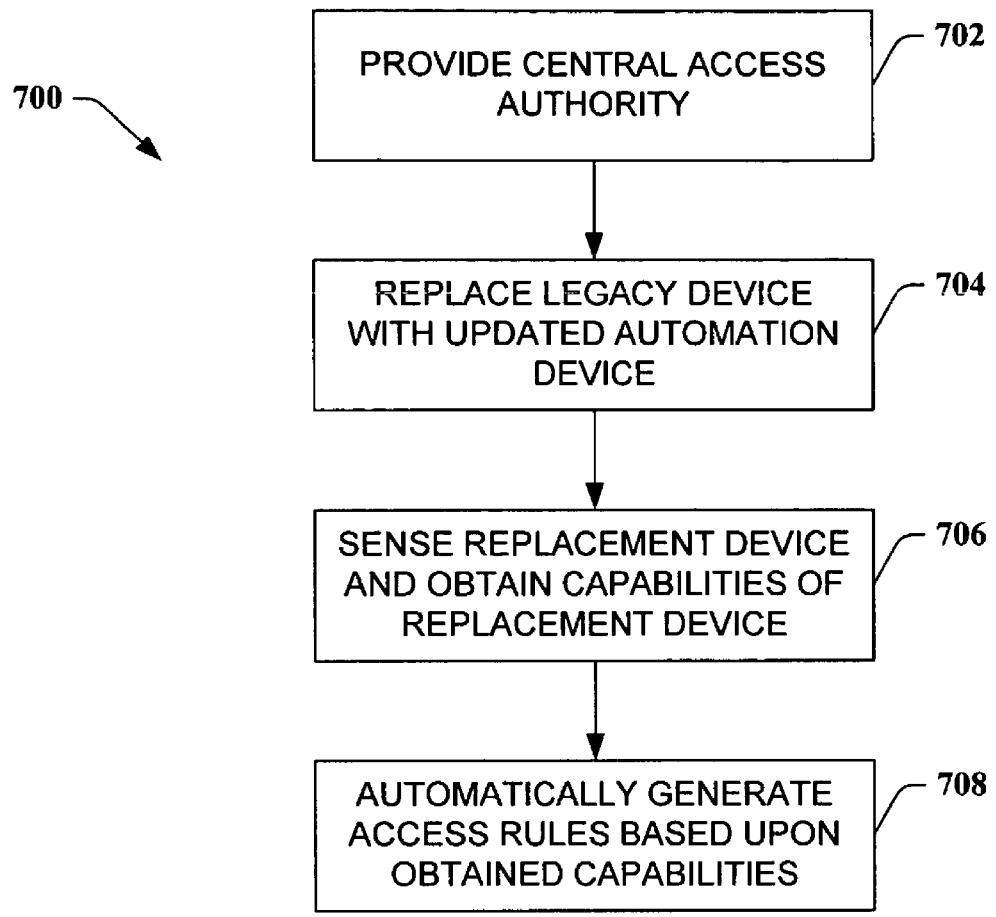
FIG. 7 is a representative flow diagram illustrating a methodology for automatically providing access rules to a device in an industrial automation system in accordance with an aspect of the subject invention.

Now referring to FIG. 7, a methodology 700 for automatically providing an automation component with access rules to enhance system security is illustrated. At 702, a central access authority is provided. The central access authority is employed to provide access rules to automation devices within an industrial system. At 704, a legacy device is replaced within the industrial system with an updated automation device. For instance, the updated automation device can include sufficient memory and processing capabilities to include internal security features. At 706, replacement of the legacy device is sensed, and capabilities of the updated automation device are automatically obtained. For instance, one or more sensors can be employed to determine that a legacy device has been disconnected and a disparate device has been positioned as a replacement for the legacy device within the industrial system. Thereafter, a data collection component can query the updated automation component to determine its capabilities (e.g., processing capabilities, memory capabilities, . . . ). At 708, access rules are provided to the update automation device based at least in part upon the automation device capabilities. For instance, rather than providing access rules to a proxy device, the access rules can be provided directly to an automation device if such device has sufficient processing and memory capabilities. The methodology 700 thus allows security for an industrial system to be automatically updated upon replacement of legacy devices.

Figure 8:
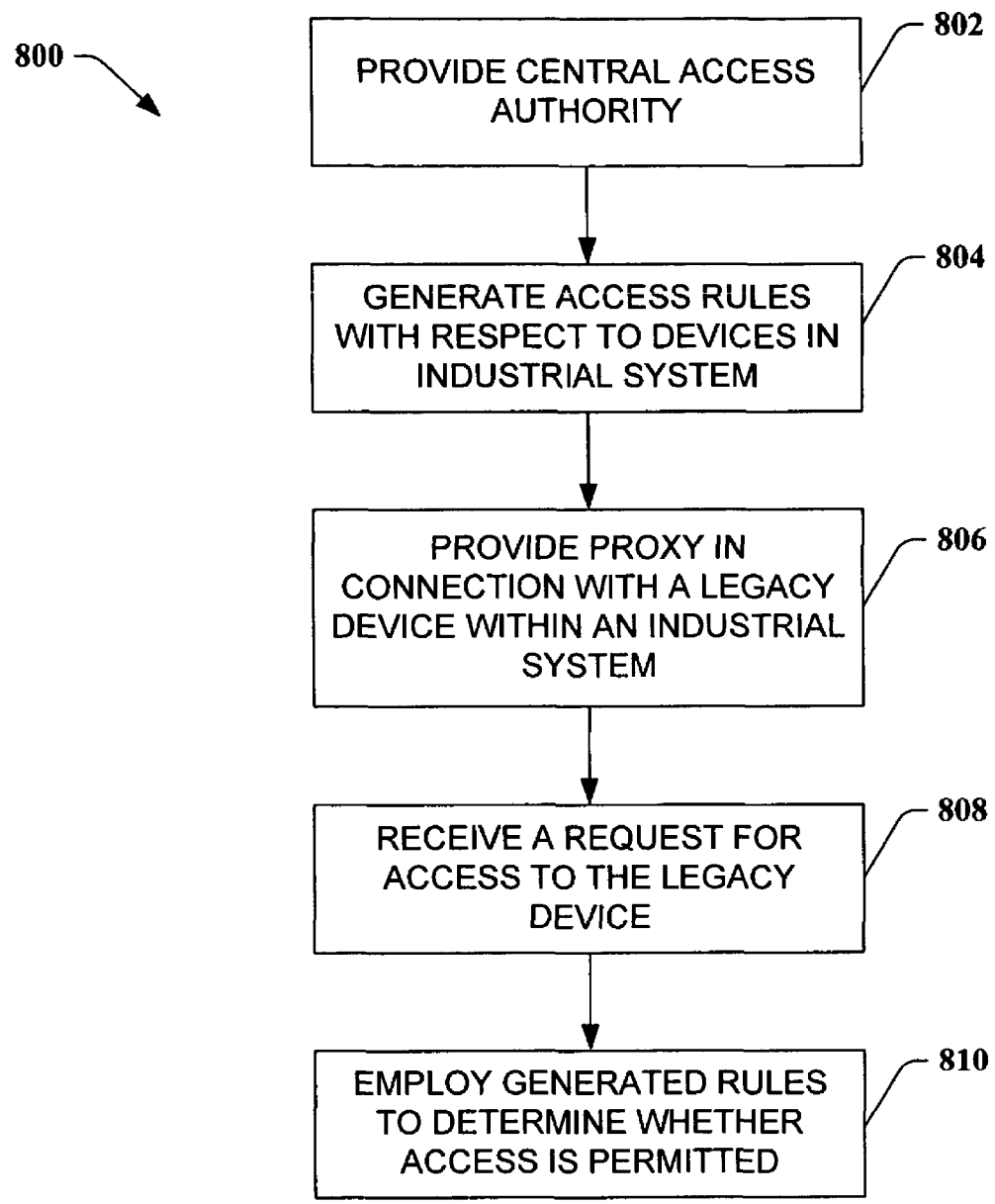
FIG. 8 is a representative flow diagram illustrating a methodology for providing enhanced security to an industrial automation system that includes a legacy device in accordance with an aspect of the subject invention.

Turning now to FIG. 8, a methodology 800 for providing security to legacy devices within an industrial system is illustrated. At 802, a central access authority is provided to facilitate security of an industrial automation system. At 804, access rules with respect to devices within the industrial automation system secured by the security system are generated. For instance, these can be generated based upon operators who are allowed access to particular devices, roles of operators, device identity, industrial automation system state, etc. These generated rules can then be maintained and administered by the central access authority. At 806, a proxy is provided in connection with one or more legacy devices. For instance, the proxy can be placed in-line with a legacy device. In accordance with one aspect of the subject invention, the proxy is not required to be physically coupled to the legacy device. Rather, the proxy can be wirelessly coupled to the legacy device via suitable wireless communication techniques and/or mechanisms. However, requests for access to the legacy device should first be delivered to the proxy. At 808, a request for access to the legacy device that is in connection with the proxy is received by the proxy. For instance, an operator, another automation device, a high-level industrial system (e.g., an ERP system, . . . ) can request access to the legacy device. At 810, the generated rules are utilized by the proxy to determine whether the requesting entity has access to the legacy device. For example, if the requesting entity is allowed access based upon the rules, the proxy can enable communications between the requesting entity and the legacy device via the proxy. If the requesting entity is not allowed access, the proxy can prevent communications between the requesting entity and the legacy device. Thus, legacy devices within an industrial automation system can be associated with security as if the devices were capable of including security features.

Figure 9:
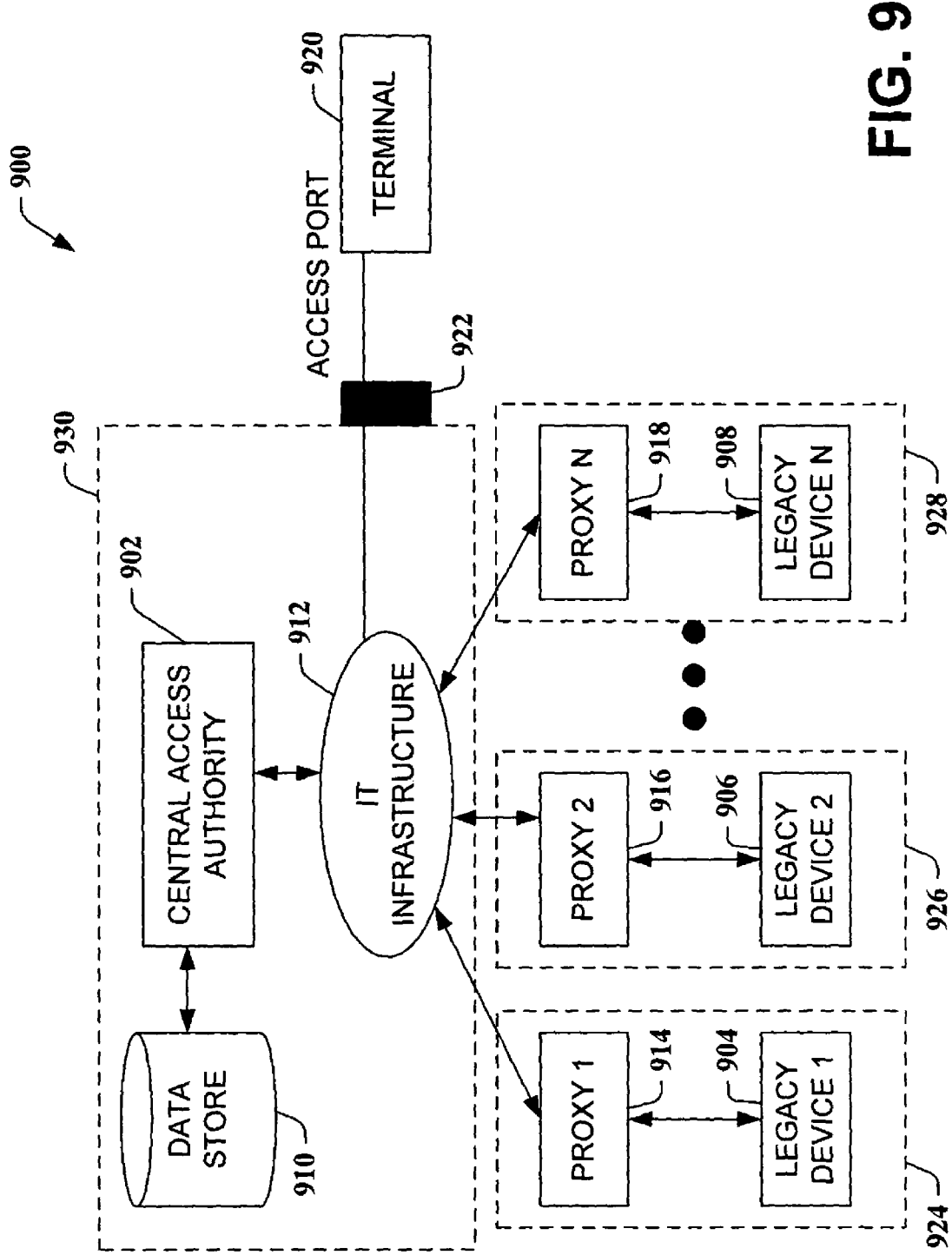
FIG. 9 is an exemplary implementation of a system that provides enhanced security with respect to an industrial automation system in accordance with an aspect of the subject invention.

Now referring to FIG. 9, an exemplary security system 900 that can be employed in accordance with the subject invention is illustrated. They system 900 includes a central access authority 902 that is employed to provide enhanced security to a plurality of legacy devices 904-908. The central access authority 902 can employ a data store 910 to store access rules relating to the plurality of legacy devices 904-908. For instance, the central access authority 902 can be utilized to assist in generating access rules, which can thereafter be stored in the data store 910. These stored access rules can later be accessed by the central access authority 902 and employed for security purposes with respect to the legacy devices 904-908 as well as other automation devices within the system 900. The data store 910 can further store audit information relating to the legacy devices 904-908. Audit information indicates an identity of an entity that accessed particular systems/devices from a particular time and a specific state. Audit information can provide a snapshot of network traffic between one or more of the legacy devices 904-908 and an entity accessing such device(s) 904-908. The captured audit information can be beneficially employed for regulatory or forensic activity and/or analysis.

The central access authority 902 provides enhanced security features to the legacy devices 904-908 via an IT infrastructure 912. This infrastructure 912 can include servers, routers, firewalls, and similar entities employed in conventional IT infrastructures. The IT infrastructure can thereafter relay access rules to the legacy devices 904-908 through corresponding proxies 914-918. The proxies 914-918 are utilized to prohibit communication to the legacy devices 904-908 unless an entity requesting access thereto is authorized. Such authorization is based upon rules provided by the central access authority 902, which can be temporarily and/or permanently stored within the proxies 914-918. For one specific example, an entity can request access to the legacy device 904, wherein a request for access is associated with request characteristics. The rules utilized by the proxy 914 that protects the legacy device 904 determine whether access should be granted to the requesting entity. These rules are provided and implemented by the central access authority 902. While the system 900 utilizes a single proxy to provide enhanced security for a single legacy device, it is to be understood that a single proxy can be employed to provide enhanced security to a plurality of legacy devices.

A terminal 920 can access the IT infrastructure 912 through an access port 922 to desirably add an automation device to the system 900 and/or alter existing access rules utilized by the system 900. For example, an automation device can be added to the system 900, and the terminal 920 can be employed to enter access rules to be employed by the central access authority 902 in connection with securing the added device(s). The terminal 920 can be authorized by any suitable authentication systems/methodologies. Thus, the system 900 of the subject invention does not require the terminal 920 to connect to each device within the system 900 to update security relating thereto. Rather, the terminal 920 can simply communicate with the central access authority 902 via the IT infrastructure 912 to update/modify security relating to an entirety of the system 900.

To further enhance security, physical barriers 924-928 can be employed to protect the legacy devices 904-908 and associated proxies 914-918 from tampering. Thus, for instance, the physical barriers 924-928 can be a cabinet that is employed to house both the proxy 914 and the corresponding legacy device 904. Therefore the legacy device 904 will act as if it has internal security features, as such legacy device 904 is housed together with the proxy 914 by the physical barrier 924. Further, alternative device configuration should be prohibited by the physical barriers 924-928. For instance, the physical barriers 924-928 can disable access to local access ports and interfaces, or at least control access thereto. For instance, the physical barriers 924-928 (e.g., cabinets and the like) can be locked by an electro-mechanical lock. The electro-mechanical locks can then be opened by an appropriate signal from a corresponding proxy 914-918. For a particular example, an operator can request physical access to the legacy device 906. The proxy 916 can receive the request and review characteristics associated with the request in light of access rules provided by the central access authority 902. If access is allowed, the proxy 916 can generate an output signal that unlocks the physical barrier 926, thereby allowing physical access to the legacy device 906. Further, sensors can be employed to ensure that the physical barrier 926 is once again locked. Particularly, after passage of a pre-determined period of time, the sensor(s) can relay information to the proxy 916 and/or the central access authority 902, and an alarm can be issued relating to the open physical barrier 926. A physical barrier 930 can also be utilized to protect the central access authority 902, the data store 910, and the IT infrastructure 912. While FIG. 9 illustrates a particular configuration of the physical barriers 924-930, it is to be understood that any suitable configuration is contemplated by the subject invention.

The central access authority 902 can also be employed to monitor and track replacement of devices. Particularly, sensors can be employed to monitor whether devices are connected. If a device is replaced unexpectedly, the central access authority 902 can generate an alarm upon determining the disconnection. In accordance with one aspect of the subject invention, the proxies 914-918 can be utilized as devices that monitor connection of one or more of the legacy devices 904-908. If a security policy precludes unexpected disconnection and/or replacement, device communication can be prohibited (and possibly communication of related devices). If unexpected replacement is allowable according to security policies provided by the central access authority 902, the updated device will be checked, and if an adequate substitute, communication relating to such device can be enabled and the alteration in the system can be logged. Authorized users (e.g., the terminal 920) override security policies by interacting with the central access authority 902 as described above.

Figure 10:
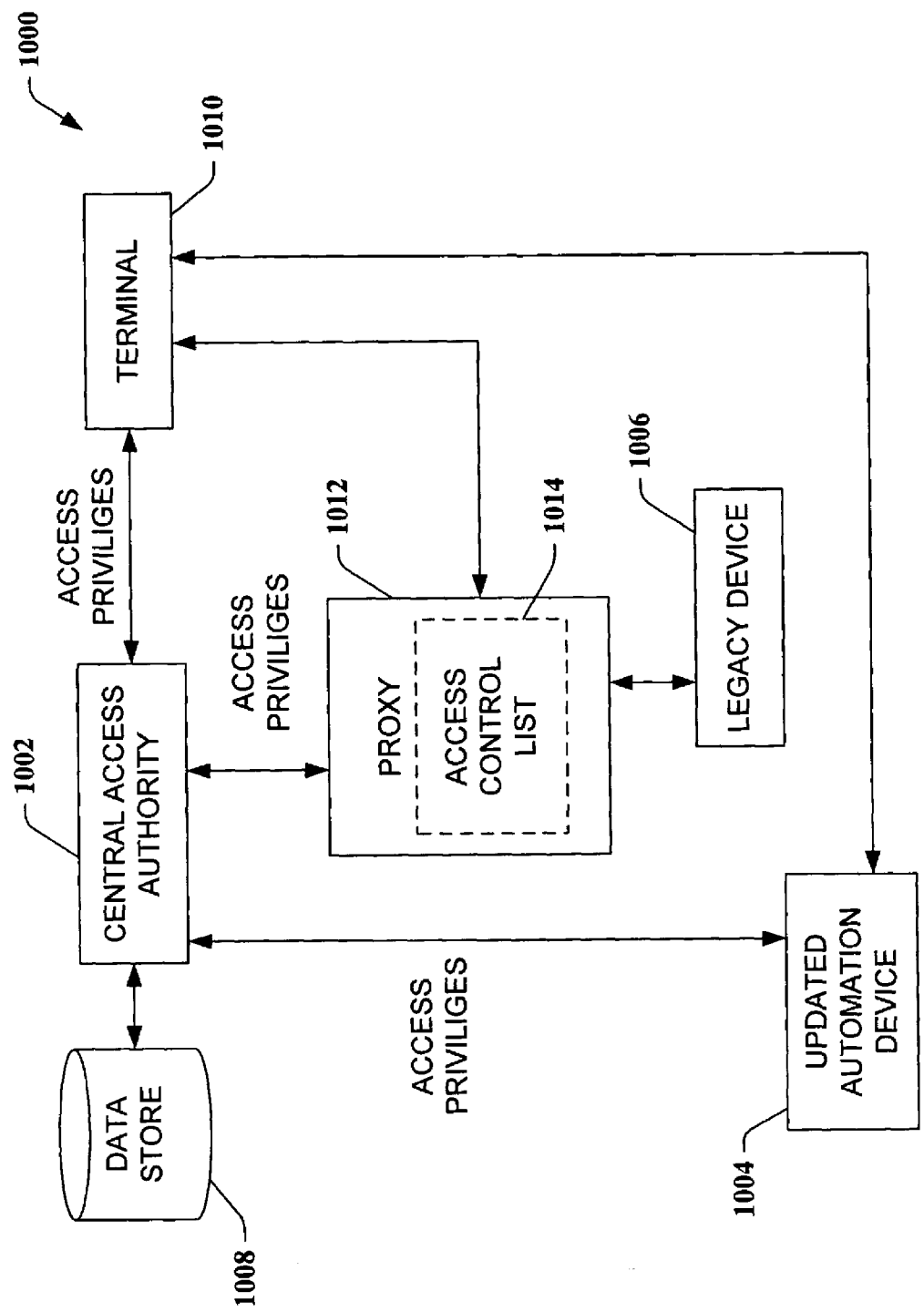
FIG. 10 is an exemplary implementation of a system that provides enhanced security with respect to an industrial automation system in accordance with an aspect of the subject invention.

Turning now to FIG. 10, an exemplary system 1000 that can be employed in connection with the subject invention is illustrated. The system 1000 includes a central access authority 1002 that provides access rules relating to devices within the system 1000. Particularly, the central access authority 1002 provides access rules relating to an updated automation device 1004 and a legacy device 1006. The updated automation device 1004 can include security features internally, while the legacy device 1006 lacks such capabilities. The central access authority 1002 can access and/or store the rules from/in a data store 1008. Further, the central access authority 1002 can store audit information associated with the system 1000 in the data store 1008. A terminal 1010 requests access privileges from the central access authority 1002. For instance, the terminal can be a portable device that is utilized to store access privileges associated therewith. In a disparate embodiment, the terminal 1010 can directly communicate with the updated automation device 1004 and/or a proxy 1012 that protects the legacy device via any suitable network. The central access authority 1002 can authenticate the terminal 1010 (and operator thereof), and deliver access privileges to the terminal 1010 as well as corresponding access privileges to the updated automation device 1004. Thereafter, if the terminal 1010 is on-line with the central access authority 1002, it can communicate with the updated automation device 1004 via the central access authority 1002 (e.g., the central access authority 1002 can authenticate the terminal 1010 and thereafter enable communications to the updated automation device 1004). In a disparate embodiment, the terminal 1010 can retain the access privileges, and thereafter directly communicate with the updated automation device 1004. For example, the updated automation device 1004 can request the access privileges assigned to the terminal 1010 by the central access authority 1002. As such privileges are stored on the terminal 1010, the terminal 1010 can relay the access privileges to the updated automation device 1004. The updated automation device 1004 can determine whether to allow communications with the terminal 1010 based upon the access privileges provided to the updated automation device 1004 by the central access authority 1002 and the access privileges provided by the terminal 1010.

The terminal 1010 can obtain access privileges relating to the proxy 1012. Particularly, the terminal 1010 can request access privileges to the legacy device 1006 from the central access authority 1002. These access privileges can be delivered to the proxy 1012 and stored on an access control list. Further, the access privilege can be provided to the terminal 1010 and stored internally therein. Thereafter, the terminal 1010 can request a communication with the legacy device 1006 via the proxy 1012. The proxy 1012 can query the terminal for its access privileges and compare such privileges with access privileges stored within the access control list 1014. Thereafter, a determination can be made regarding whether the terminal 1010 should be provided access to the legacy device 1006. Thus, the system 1000 enables a central security system to provide security to both updated automation devices as well as legacy devices that reside in a same industrial automation system.

Figure 11:
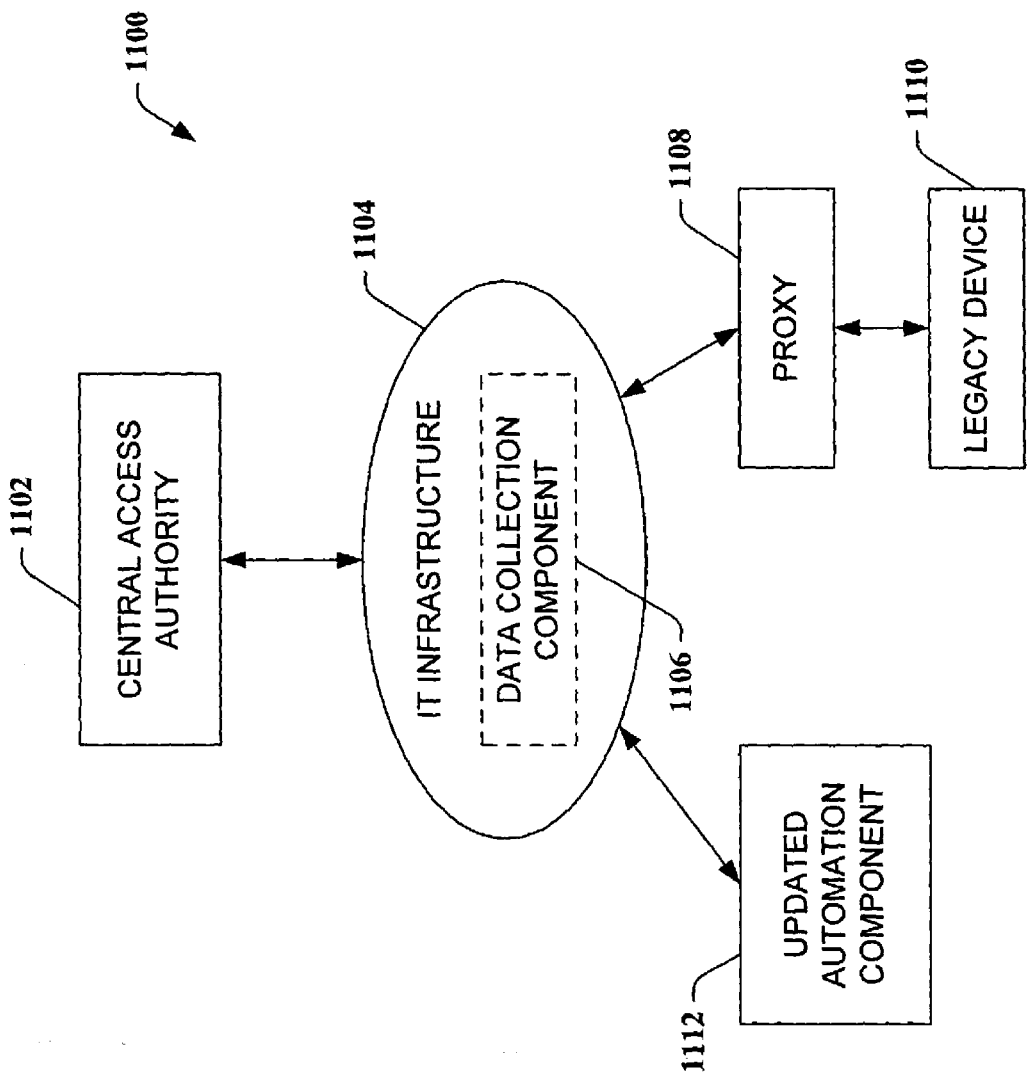
FIG. 11 is an exemplary implementation of a system that provides enhanced security with respect to an industrial automation system in accordance with an aspect of the subject invention.

Referring now to FIG. 11, a system 1100 that provides enhanced security to an industrial automation system that includes one or more legacy devices is illustrated. The system 1100 includes a central access authority 1102 that is employed to provide access rules relating to automation devices within the system 1100. The central access authority 1102 communicates with automation devices via an IT infrastructure 1104. Within the IT infrastructure is a data collection component 1106 that collects data relating to devices within the system 1100. For instance, the data collection component 1106 can obtain capabilities, interconnections, and the like relating to automation devices within the system 1100. The system 1100 further includes a proxy 1108 that is utilized to protect a legacy device 1110 from unauthorized communication/access as well as monitor the legacy device 1110 for tampering and disconnection. For instance, if an entity desires to communicate with the legacy device 1110, such entity first must be authorized by the proxy 1108. Otherwise, the proxy 1108 blocks all communications to/from the legacy device 1110.

The system 1100 further includes an updated automation component 1112 that recently replaced a legacy device. The data collection component 1106 can be aware of such replacement, and query the updated automation component 1112 for capabilities, interconnections, and the like. The data collection component 1106 can determine that the updated automation component 1112 can house internal security procedures. Thereafter, such security procedures can be automatically provided by the central access authority 1102 to the updated automation component 1112 via the IT infrastructure 1104. In accordance with a disparate aspect of the subject invention, the updated automation component 1112 can receive security information from storage relating to a proxy.

Figure 12:
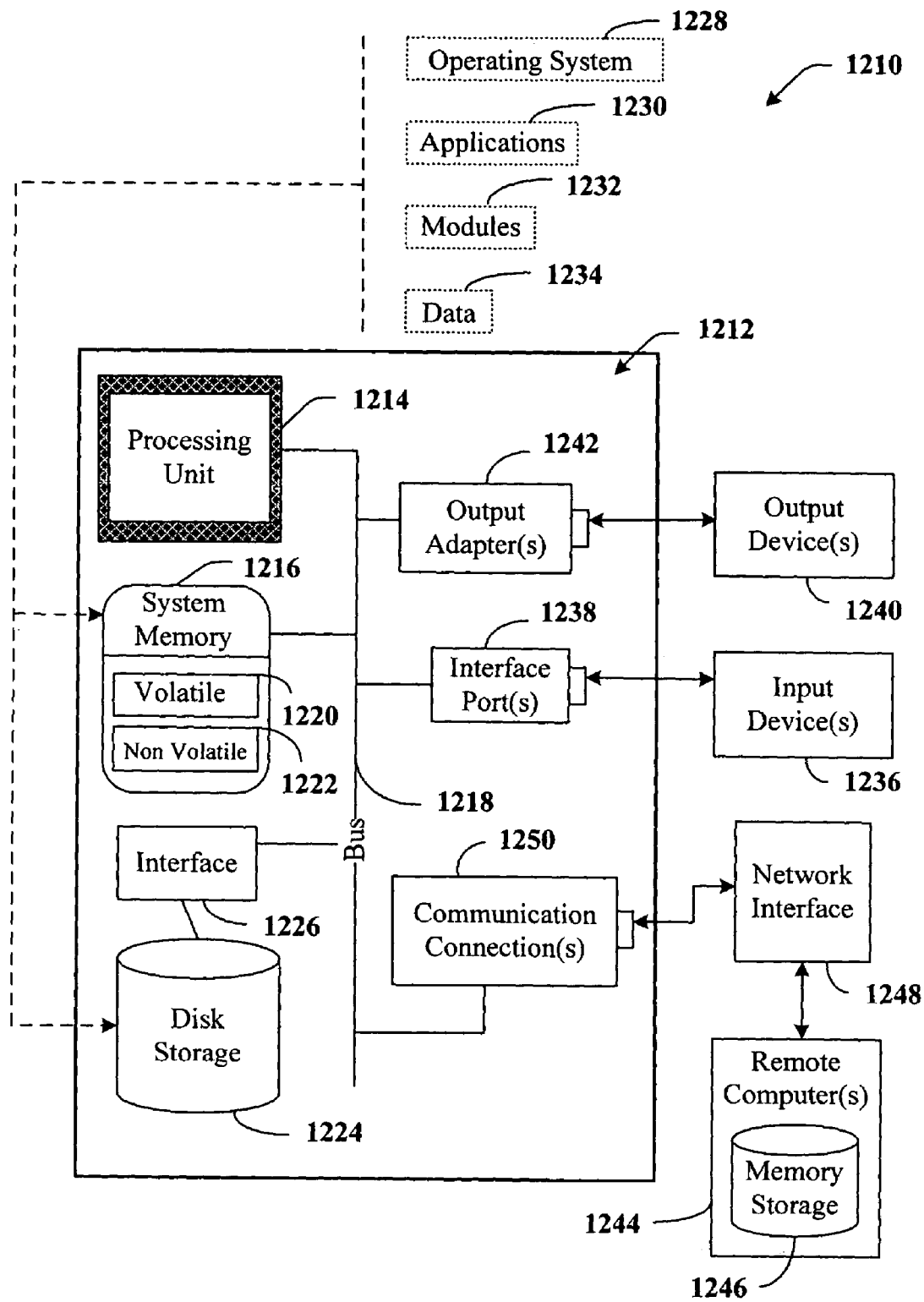
FIG. 12 is an exemplary operating environment that can be employed in connection with the subject invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
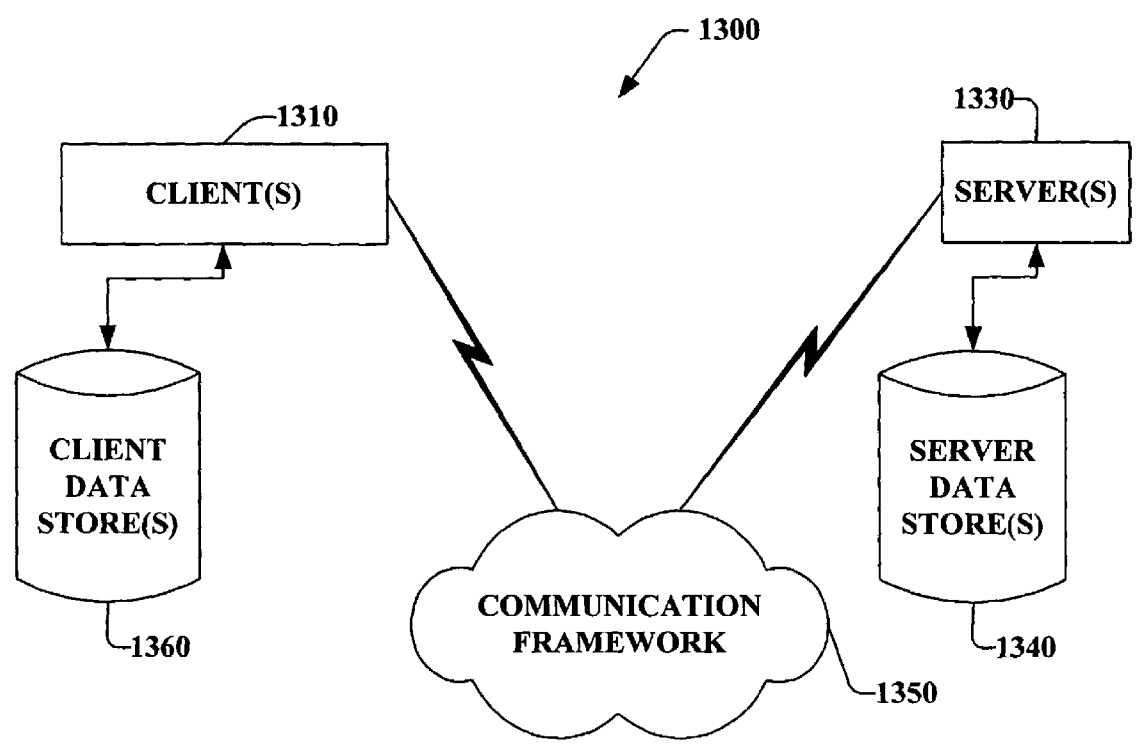
FIG. 13 is an exemplary operating environment that can be employed in connection with the subject invention.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates enhanced security with respect to an industrial automation environment, comprising:
   a central access authority embodied on a computer-readable storage medium and executed by one or more processors, the central access authority configured to provide access rules relating to a device; and
   a proxy associated with the device configured to receive the access rules from the central access authority if it is determined that the device is not capable of storing the access rules internally, wherein the proxy is configured to directly receive an access request directed to the device and to determine whether the access request is permitted based at least in part upon characteristics of the access request and the access rules,
   wherein the proxy is further configured to issue a query to the device and to create a fingerprint of the device based on the query, the fingerprint logically linking the proxy to the device, and
   wherein the proxy is further configured to detect replacement of the device with a replacement device and to employ the fingerprint to confirm that the replacement device is a valid replacement.

2. The system of claim 1, wherein the proxy is configured to one of permit or deny access to the device based at least in part upon characteristics of the access request and the access rules.

3. The system of claim 1, wherein the characteristics comprise at least one of an identity of an entity requesting access, an identity of the device, a location of origination of the access request, a location of the legacy device, a read-only request, a read/write request, a write-only request, or a time the access request was received by the proxy.

4. The system of claim 1, wherein the proxy is configured to disable access upon inactivity of a pre-determined duration.

5. The system of claim 4, wherein the inactivity is based upon a lack of data flow.

6. The system of claim 4, wherein the inactivity is based upon a link-level disconnection notification.

7. The system of claim 4, wherein the inactivity is determined by pinging an entity that requests access.

8. The system of claim 1, wherein the access request is received from an operator.

9. The system of claim 1, wherein the access request is received from an automation device.

10. The system of claim 1, wherein an inline communication device comprises the proxy.

11. The system of claim 10, wherein the inline communication device is a dongle fitted external to the device.

12. The system of claim 1, wherein the access rules include at least one security policy indicating whether replacement of the device is allowed, and the proxy prohibits communication to the replacement device if the at least one security policy indicates that replacement of the device is not allowed.

13. The system of claim 11, wherein the dongle is attached to an access port of one or more of the device or a remote terminal.

14. The system of claim 1, wherein an information technology (IT) infrastructure device comprises the proxy.

15. The system of claim 14, wherein the IT infrastructure device is one or more of an intelligent switch, a firewall, or a router.

16. The system of claim 1, wherein a server comprises the proxy.

17. The system of claim 1, wherein the proxy is configured to regulate access to a plurality of devices.

18. The system of claim 1, wherein the proxy device is associated with a sensor that monitors whether the device is connected to the proxy.

19. The system of claim 1, wherein the central access authority is configured to query the device to determine whether the device is capable of storing the access rules internally, and to provide the access rules directly to the device if it is determined that the device is capable of storing the access rules, wherein the central access authority provides the access rules to the proxy if it is determined that the device is not capable of storing the access rules internally.

20. The system of claim 18, wherein the sensor is configured to monitor the device at an application level.

21. The system of claim 1, wherein the proxy is configured to communicate with one or more of a disparate proxy or a server upon detection of tampering.

22. The system of claim 1, wherein the central access authority is configured to monitor the proxy, and to take action upon determining that the proxy has been disconnected from the device.

23. The system of claim 1, wherein the characteristics include at least a relative location of an entity requesting the access with respect to the device.

24. A method for enhancing security in an industrial automation system that includes one or more devices, comprising:
    employing one or more processors executing computer-executable instructions stored on a computer-readable storage medium to implement the following acts:
    associating a device with a proxy;
    creating a fingerprint of the device based on at least one query of the device by the proxy, the fingerprint logically linking the device to the proxy;
    providing the proxy with access rules defining access permissions for the device;
    receiving, at the proxy, a request from a remote terminal to access the device;
    determining whether access to the device is granted or denied to the remote terminal based on the access rules and the request;
    detecting that the device has been replaced with a replacement device; and
    determining if the replacement device is a valid replacement based at least on the fingerprint.

25. The method of claim 24, further comprising generating access privileges for the remote terminal based at least in part on a relative location of the remote terminal with respect to the device.

26. The method of claim 24, further comprising:
monitoring whether the device is connected to the proxy; and
generating an alarm upon determining that the device has been disconnected from the proxy.

27. The method of claim 24, further comprising:
determining if the access privileges preclude replacement of the device;
if the determining determines that the access privileges do not preclude replacement of the device:
   checking the replacement device to determine if the replacement device is a valid substitute for the device; and
   enabling communication to the replacement device subject to the access privileges; and
if the determining determines that the access privileges preclude replacement of the devices:
   prohibiting communication to the replacement device.

28. The method of claim 24, further comprising unlocking a lock associated with a physical barrier that protects the proxy and the device upon receipt of a signal from the proxy.

29. The method of claim 27, wherein the checking the replacement device comprises employing the fingerprint to validate the replacement device.

30. The method of claim 24, further comprising:
querying the replacement device in response to the detecting to determine at least one of processing capabilities or memory capabilities of the replacement device;
providing access rules associated with the replacement device directly to the replacement device if the querying determines that the replacement device has sufficient processing and memory capabilities; and
providing the access rules to the proxy if the querying determines that the replacement device does not have sufficient processing and memory capabilities.

31. An apparatus that provides enhanced security, comprising:
an analysis component configured to maintain one or more access rules defining whether a requesting entity is permitted to access to a first automation device associated with the apparatus, wherein the analysis component is further configured to issue a query to the first automation device and to create a fingerprint of the device that logically links the device to the proxy based on results of the query, and is further configured to employ the fingerprint to confirm validity of a second automation device upon detecting that the first automation device has been replaced by the second automation device; and
an activity sensor configured to monitor activity between the requesting entity and the device if the access rules permit the requesting entity to access the device.

* * * * *